Feb. 12, 1935.                C. B. HATHAWAY                1,991,092
                           LAMINATED POLE PIECE
                            Filed July 1, 1932
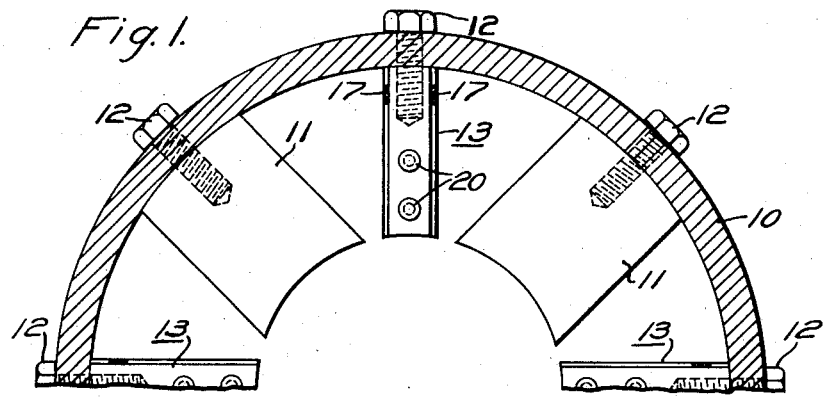
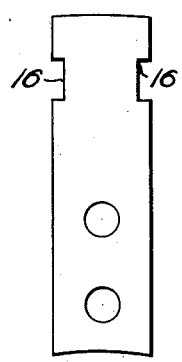
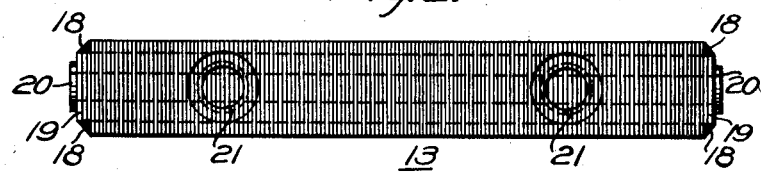
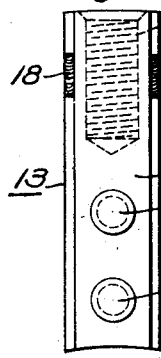
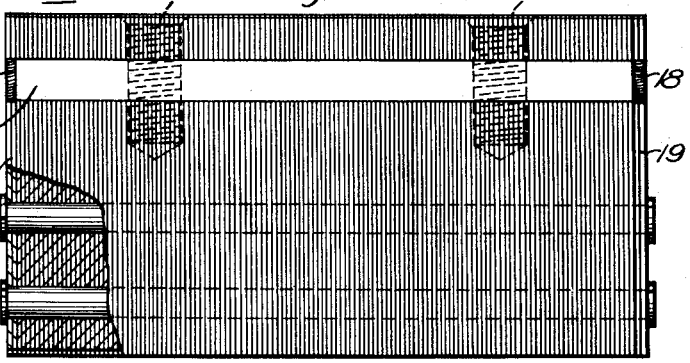
WITNESSES:                                          INVENTOR
                                                Clarence B. Hathaway.
                                                BY
                                                    ATTORNEY Patented Feb. 12, 1935

1,991,092

UNITED STATES PATENT OFFICE 1,991,092

LAMINATED POLE PIECE

Clarence B. Hathaway, Wilkinsburg, Pa., assignor to Westinghouse Electric & Manufacturing Company, East Pittsburgh, Pa., a corporation of Pennsylvania Application July 1, 1932, Serial No. 620,350

7 Claims. (Cl. 171—252)

My invention, in general, relates to dynamo-electric machines and more particularly to the construction of laminated commutating poles of a dynamo-electric machine.

In the design of a dynamo-electric machine having commutating poles, because of the limited amount of mechanical space, the commutating poles must of necessity be relatively narrow. Also, since the commutating zone of a dynamo-electric machine is relatively small, being substantially no wider than the brush, nothing is gained electrically by making the width of the commutating pole any wider than the commutating zone.

Because a commutating pole is relatively narrow, a great deal of difficulty has been experienced in permanently securing a commutating pole of the laminated type to the frame of a dynamo-electric machine.

In actual practice the laminated commutating poles are so narrow that, when they are secured to the frame of the dynamo-electric machine by a bolt extending through the frame, the width between the wall of the threaded opening in the body of the laminated commutating pole that receives the connecting bolt and the sides of the body of the laminated commutating pole is so small that no space is available for riveting the laminae securely together. Accordingly, if the laminated commutating poles are to be secured to the frame by means of a bolt extending through the frame, other means than the conventional riveted construction must be employed for rigidly securing the laminae of the commutating pole together as a unitary structure.

Therefore, it is an object of my invention to provide for rigidly securing the assembled laminae of a commutating pole together by welding the ends of an independent bar that is disposed along the sides of the body of the commutating pole to the end lamina of the body of the commutating pole.

Another object of my invention is to so construct a laminated commutating pole that it may be securely bolted to the frame of a dynamo-electric machine.

Another object of my invention is the provision of a commutating pole that shall be simple and efficient in operation, and be readily manufactured and installed.

Other objects and a fuller understanding of my invention may be had by referring to the following specification taken in conjunction with the accompaning drawing, in which:

Figure 1 is a fragmentary view of a dynamo-electric machine having commutating poles embodying the features of my invention;

Fig. 2 is a plan or top view of the showing in Fig. 3 and illustrates a laminated commutating pole embodying the features of my invention;

Fig. 3 is a side elevational view of the laminated commutating pole shown in Fig. 2, and a part of which is shown in section to illustrate the structural details thereof;

Fig. 4 is an end elevational view of the laminated commutating pole shown in Fig. 3, and Fig. 5 is a side elevational view of one of the laminae of the body of the commutating pole.

With particular reference to Figs. 1 to 4, inclusive, of the drawing, the reference character 13 designates generally a laminated commutating pole embodying the features of my invention. As shown in Fig. 1, the laminated commutating poles 13 are mounted between the main poles 11 of the dynamo-electric machine. The main poles 11 and the commutating poles 13 are preferably secured to the frame 10 of the dynamo-electric machine by means of suitable bolts 12, which extend radially through the frame 10 and threadably engage threaded openings 21 in the top portion of the poles. As hereinbefore pointed out, when the commutating poles 13 are secured to the frame 10 of the dynamo-electric machine by means of the bolts 12, the distance between the threaded opening 21 and the sides of the commutating poles is so small that no space is available for rigidly securing the laminae together, by means of the conventional riveted connection. Therefore, in line with the objects of my invention I provide notches 16 on the opposite sides of each of the laminae so that when the laminae are assembled the notches 16 provide a continuous groove on each side of the body of the pole. On each end of the assembled laminae is provided a suitable end-plate 19, which is preferably constructed of laminated material, which may have the same magnetic properties as the main laminae of the body of the commutating pole.

Mounted within the groove on each side of the body of the pole 13 is an independent connecting bar 17. The ends of the connecting bars 17 may be welded at 18 or otherwise suitably connected to the end-plates 19. For a welded connection, the end-plates 19 are preferably of such width that their edges align with the bottom of the grooves 16 provided on the sides of the body of the pole. In this manner a suitable V-notch is provided which enables the welder to make a very strong and durable weld.

The laminae of the lower part of the commutating pole, that is, the part below the depth of the threaded opening 21, is securely connected together by suitable rivets 20 which extend through the entire length of the commutating pole. However, it is to be understood that the rivets 20 could be dispensed with by providing a longitudinal groove in the sides of the lower part of the laminated commutating pole 13 and utilizing an extra set of interconnecting bars such as the bars 17 and welding the ends thereof to end plates such as 19.

As a modification, the notches 16 may be small V-shaped notches which, when the laminæ are assembled, constitute continuous V-shaped grooves, whereby the laminæ may be securely held together as a unitary structure by welding a continuous bead within the V-shaped grooves. Also, the V-shaped grooves may be dispensed with by welding a continuous bead over the outside transverse surface of the assembled laminæ.

Since certain changes in my invention may be made without departing from the spirit and scope thereof, it is intended that all matters contained in the foregoing description and shown in the accompanying drawing shall be interpreted as illustrative and not in a limiting sense.

I claim as my invention:

1. A laminated pole for a dynamo-electric machine comprising, in combination, a plurality of assembled laminæ, means including an independent bar disposed along the side of said laminæ for securing the assembled laminæ in rigid relationship to form a unitary structure, and means for connecting each end of the said bar to the end lamina of the laminated pole.

2. A laminated structure comprising, in combination, a plurality of assembled laminæ each having a notch so formed on the opposite sides thereof that when the laminæ are assembled the notches constitute a continuous groove along the sides of the assembled laminæ, and a bar disposed in each of said grooves for securing the assembled laminæ in rigid relationship to form a unitary structure, each end of said bars being welded to the end lamina of the laminated structure.

3. A laminated structure comprising, in combination, a plurality of assembled laminæ each having a notch so formed on the opposite sides thereof that when the laminæ are assembled the notches constitute a continuous groove along the sides of the assembled laminæ, an end lamina for each end of the assembled laminæ, the width of each of said end lamina being substantially equal to the transverse distance between the grooves of the assembled laminæ, and a bar disposed in each of said grooves for securing the assembled laminæ in rigid relationship to form a unitary structure, each end of said bars being welded to opposite end lamina of the laminated structure.

4. A narrow laminated interpole that is adapted to be bolted to the frame of a dynamo-electric machine comprising, in combination, a plurality of laminæ assembled to constitute the body of the interpole said body having a threaded opening, a bolt to be received by the threaded opening for connecting the interpole to the frame of the dynamo-electric machine, the width between the wall of the threaded opening and the sides of the body of the interpole being relatively small, means including a bar disposed along the sides of the body of the interpole to secure the assembled laminæ together as a unitary structure, and means for connecting each end of the said bars to the end laminæ of the body of the interpole.

5. A narrow laminated interpole that is adapted to be bolted to the frame of a dynamo-electric machine comprising, in combination, a plurality of laminæ assembled to constitute the body of the interpole said body having a threaded opening, a bolt to be received by the threaded opening for connecting the interpole to the frame of the dynamo-electric machine, the width between the wall of the threaded opening and the sides of the body of the interpole being relatively small, said body having a groove formed along the sides thereof, and an independent bar disposed in said grooves for securing the assembled laminæ together as a unitary structure, each end of said bars being welded to the end lamina of the body of the interpole.

6. A narrow laminated interpole that is adapted to be bolted to the frame of a dynamo-electric machine comprising, in combination, a plurality of laminæ assembled to constitute the body of the interpole said body having a threaded opening, a body to be received by the threaded opening for connecting the interpole to the frame of the dynamo-electric machine the width between the wall of the threaded opening and the sides of the body of the interpole being relatively small, said body having a groove formed along the sides thereof, a lamina for each end of the body of the interpole, the width of each of said end lamina being substantially equal to the transverse distance between the said grooves, and an independent bar disposed in said grooves for securing the assembled laminæ together as a unitary structure, each end of said bars being welded to the end lamina of the body of the interpole.

7. A laminated pole for a dynamo-electric machine comprising, in combination, a plurality of assembled laminæ, means including an independent bar for securing the assembled laminæ in rigid relationship to form a unitary structure, and means for connecting each end of the said bar to the end lamina of the laminated pole.

CLARENCE B. HATHAWAY.